(12) United States Patent
Teranishi et al.

(10) Patent No.: US 7,975,261 B2
(45) Date of Patent: Jul. 5, 2011

(54) TASK TRANSITION CHART DISPLAY METHOD AND DISPLAY APPARATUS

(75) Inventors: Masaomi Teranishi, Kawasaki (JP); Yasushi Hasegawa, Kanagawa (JP); Hiroyuki Morozumi, Kanagawa (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1060 days.

(21) Appl. No.: 11/802,902

(22) Filed: May 25, 2007

(65) Prior Publication Data
US 2007/0276832 A1  Nov. 29, 2007

(30) Foreign Application Priority Data

May 26, 2006 (JP) ................................. 2006-147279
Jul. 4, 2006 (JP) ................................. 2006-184661

(51) Int. Cl.
*G06F 9/44* (2006.01)
*G06F 9/46* (2006.01)

(52) U.S. Cl. ........ 717/128; 718/102; 718/105; 717/127; 717/130; 717/131

(58) Field of Classification Search .................... 714/25, 714/38; 717/128, 127, 130, 131; 718/102, 718/105
See application file for complete search history.

(56) References Cited

U.S. PATENT DOCUMENTS

| | | | | |
|---|---|---|---|---|
| 6,139,200 A * | 10/2000 | Goebel | ................. | 717/159 |
| 6,167,536 A * | 12/2000 | Mann | ................. | 714/45 |
| 6,230,313 B1 * | 5/2001 | Callahan et al. | .............. | 717/128 |
| 6,243,735 B1 * | 6/2001 | Imanishi et al. | .............. | 718/102 |
| 6,397,296 B1 * | 5/2002 | Werner | ................. | 711/122 |
| 6,557,078 B1 * | 4/2003 | Mulla et al. | ................. | 711/122 |
| 7,178,133 B1 * | 2/2007 | Thekkath | ................. | 717/128 |
| 7,788,670 B2 * | 8/2010 | Bodas et al. | ................. | 718/105 |
| 2003/0009508 A1 * | 1/2003 | Troia et al. | ................. | 709/107 |
| 2003/0088853 A1 * | 5/2003 | Iida et al. | ................. | 717/128 |
| 2004/0006724 A1 * | 1/2004 | Lakshmanamurthy et al. | | 714/25 |
| 2004/0148133 A1 * | 7/2004 | Fabritius et al. | ............. | 702/187 |
| 2005/0235102 A1 * | 10/2005 | Sakurai | ................. | 711/106 |
| 2006/0101466 A1 * | 5/2006 | Kawachiya et al. | .......... | 718/100 |
| 2006/0117224 A1 * | 6/2006 | Wu | ................. | 714/38 |
| 2007/0011513 A1 * | 1/2007 | Biswas et al. | ................. | 714/722 |
| 2007/0130140 A1 * | 6/2007 | Cytron et al. | ................. | 707/6 |
| 2008/0295104 A1 * | 11/2008 | Fujihara et al. | .............. | 718/103 |

FOREIGN PATENT DOCUMENTS

| | | |
|---|---|---|
| JP | 4-215192 | 8/1992 |
| JP | 9-73405 | 3/1997 |
| JP | 2003-208333 | 7/2003 |

OTHER PUBLICATIONS

Huang et al, "A Methodology for Evaluating Runtime Support in Network Processors", Dec. 3-6, 2006, ACM, pp. 113-122.*
Gerstlauer et al, "RTOS Modeling for System Level Design", 2003, IEEE, pp. 1-6.*

* cited by examiner

*Primary Examiner* — Emerson C Puente
*Assistant Examiner* — Charles Swift
(74) *Attorney, Agent, or Firm* — Staas & Halsey LLP

(57) ABSTRACT

Aiming at enabling an analysis of relationship between a task transition and performance information such as mis-caching in a multiprocessor system and clearly identifying a relationship between a degree of parallelism and the task transition of the system processing, trace information and performance information corresponding to the trace information are obtained from memory, and the task transition state and performance information based on the trace information are displayed by superimposing on the transition chart. A degree of parallelism corresponding to an operation state of a plurality of processors is calculated on the basis of the trace information, and the degree of parallelism is displayed by being temporally synchronized with the task transition chart.

10 Claims, 16 Drawing Sheets

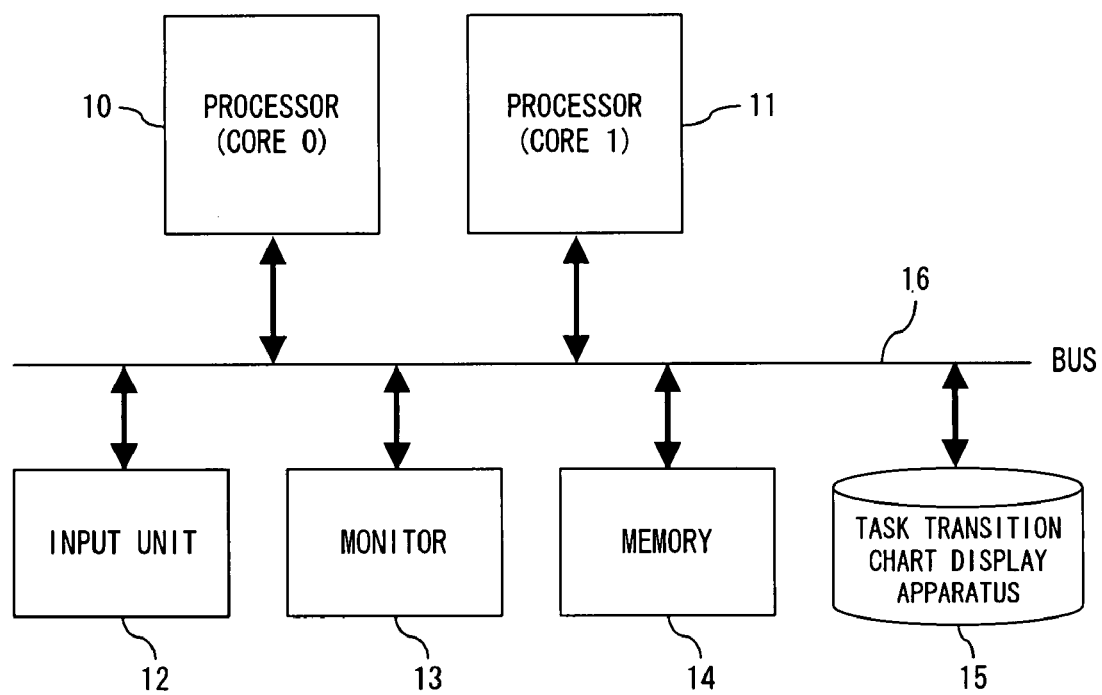
F I G. 2

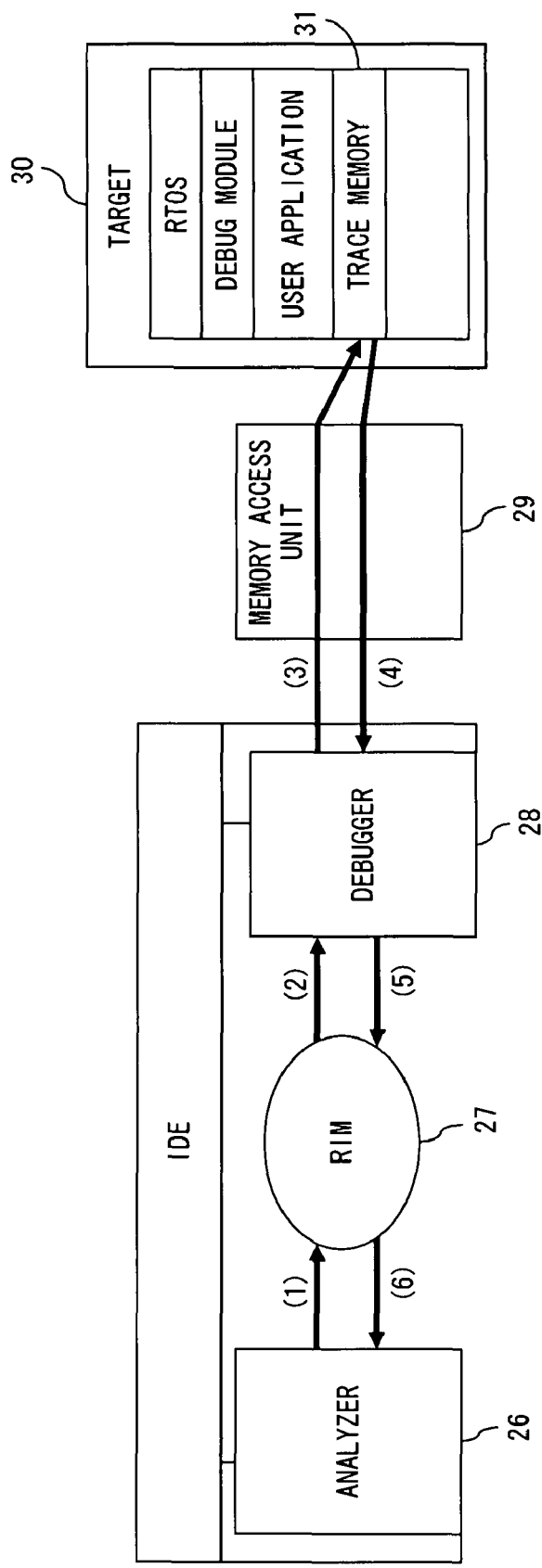
F I G. 5

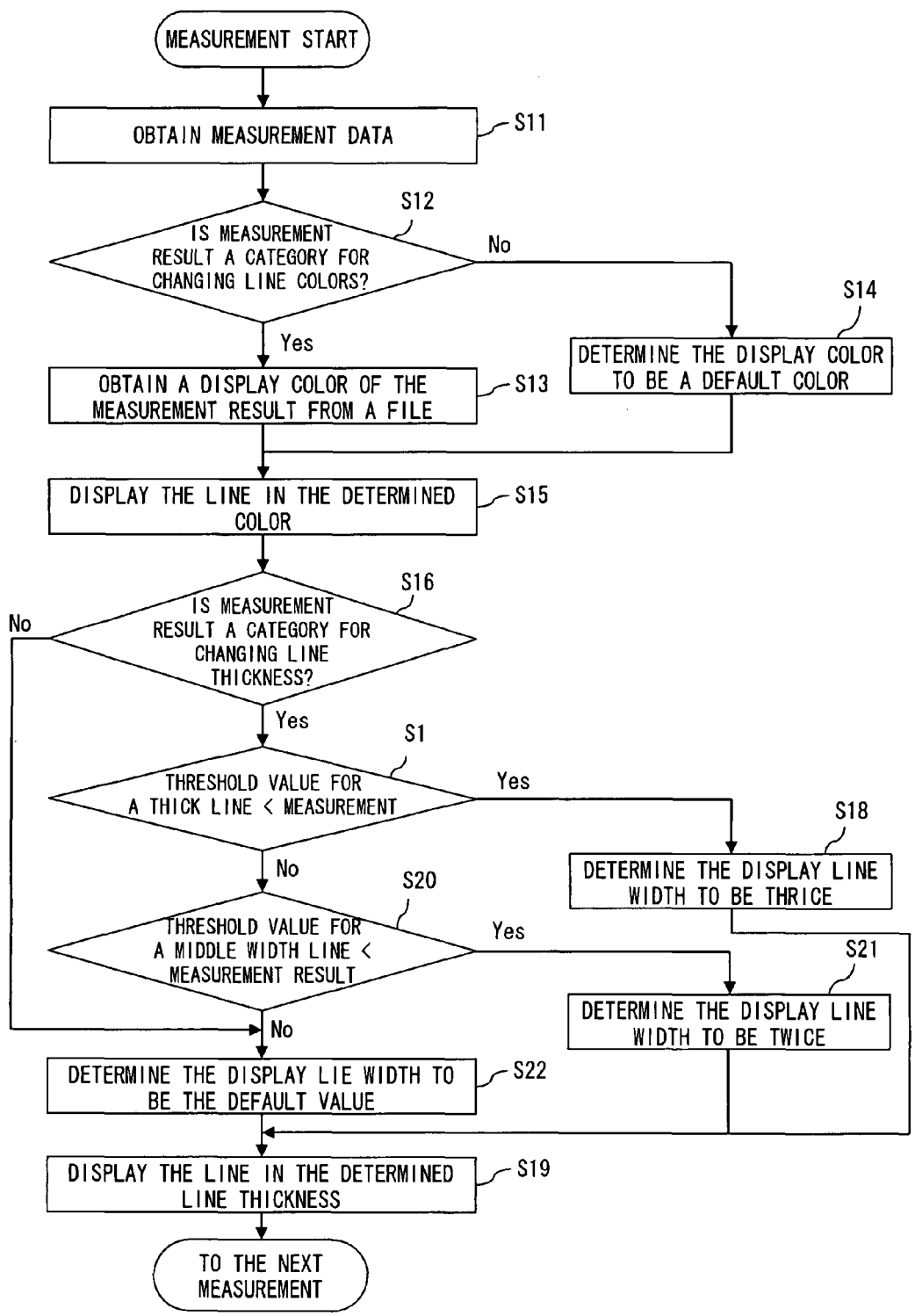
F I G. 7

| IDENTIFIER | DATA 1 | DATA 2 | DATA 3 | DATA 4 | DATA 5 | DATA 6 | DATA 7 | DATA 8 | DATA 9 | DATA 10 | DATA 11 |
|---|---|---|---|---|---|---|---|---|---|---|---|
| LINENUM | 3 | | | | | | | | | | |
| LINE1 | 10 | | | | | | | | | | |
| LINE2 | 20 | | | | | | | | | | |
| LINE3 | 30 | | | | | | | | | | |
| COLORNUM | 6 | | | | | | | | | | |
| COLOR1 | 255 | 255 | 255 | | | | | | | | |
| COLOR2 | 128 | 128 | | | | | | | | | |
| COLOR3 | 255 | 128 | 128 | | | | | | | | |
| COLOR4 | 128 | 255 | 255 | | | | | | | | |
| COLOR5 | 128 | 128 | 128 | | | | | | | | |
| COLOR6 | 64 | 64 | 64 | | | | | | | | |
| PANUM | 2 | | | | | | | | | | |
| PA1 | "NUMBER OF MIS-CACHING" | "Number of cache miss" | 5 | LINE1 | COLOR1 | 20 | LINE2 | COLOR2 | 50 | LINE3 | COLOR3 |
| PA2 | "MEMORY ACCESS CONFLICT" | "Conflict memory access" | 1 | LINE1 | COLOR4 | 2 | LINE2 | COLOR5 | 3 | LINE3 | COLOR6 |

F I G. 8

| LOG TYPE | PER-TYPE ID | TYPE - EVENT | ID No. | SC ADDRESS | PARAMETER 0 | PARAMETER 1 | PARAMETER 2 | RETURN VALUE | LOW CLOCK TIME | HIGH CLOCK TIME | RESERVE |
|---|---|---|---|---|---|---|---|---|---|---|---|
| Dispatch | | LOG_LEAVE | TASK ID | | PA_STA | 0 | | | LOW CLOCK TIME | HIGH CLOCK TIME | |
| | | | | | | | | | | | |
| Dispatch | | LOG_ENTER | TASK ID | | PA_END | PA VALUE AT THE END | | | LOW CLOCK TIME | HIGH CLOCK TIME | |

FIG. 9

| No. OF INTERRUPTS | No. OF CYCLES | No. OF MIS-CACHING | No. OF MEMORY READS | No. OF MEMORY WRITES | No. OF MEMORY MIS-READS | DMA EXECUTION TIME | MEMORY ACCESS CONFLICT | REGISTER INTERFERENCE |
|---|---|---|---|---|---|---|---|---|
| 2000 | 401351000 | 100 | 144 | 130 | 10 | 2 | 0 | 1 |
| 2100 | 421351000 | 100 | 150 | 138 | 10 | 2 | 0 | 1 |
| 2200 | 441351000 | 110 | 156 | 144 | 11 | 2 | 0 | 2 |

F I G. 1 0

| LOG TYPE | PER-TYPE ID | TYPE - EVENT | ID No. | SC ADDRESS | PARAMETER 0 | PARAMETER 1 | PARAMETER 2 | RETURN VALUE | LOW CLOCK TIME | HIGH CLOCK TIME | RESERVE | PERFORMANCE INFORMATION |
|---|---|---|---|---|---|---|---|---|---|---|---|---|
| Dispatch | | LOG_LEAVE | TASK ID | | PA_STA | 0 | | | LOW CLOCK TIME | HIGH CLOCK TIME | | 100 |
| | | | | | | | | | | | | 150 |
| Dispatch | | LOG_ENTER | TASK ID | | PA_END | PA VALUE AT THE END | | | LOW CLOCK TIME | HIGH CLOCK TIME | | 200 |

F I G. 1 1

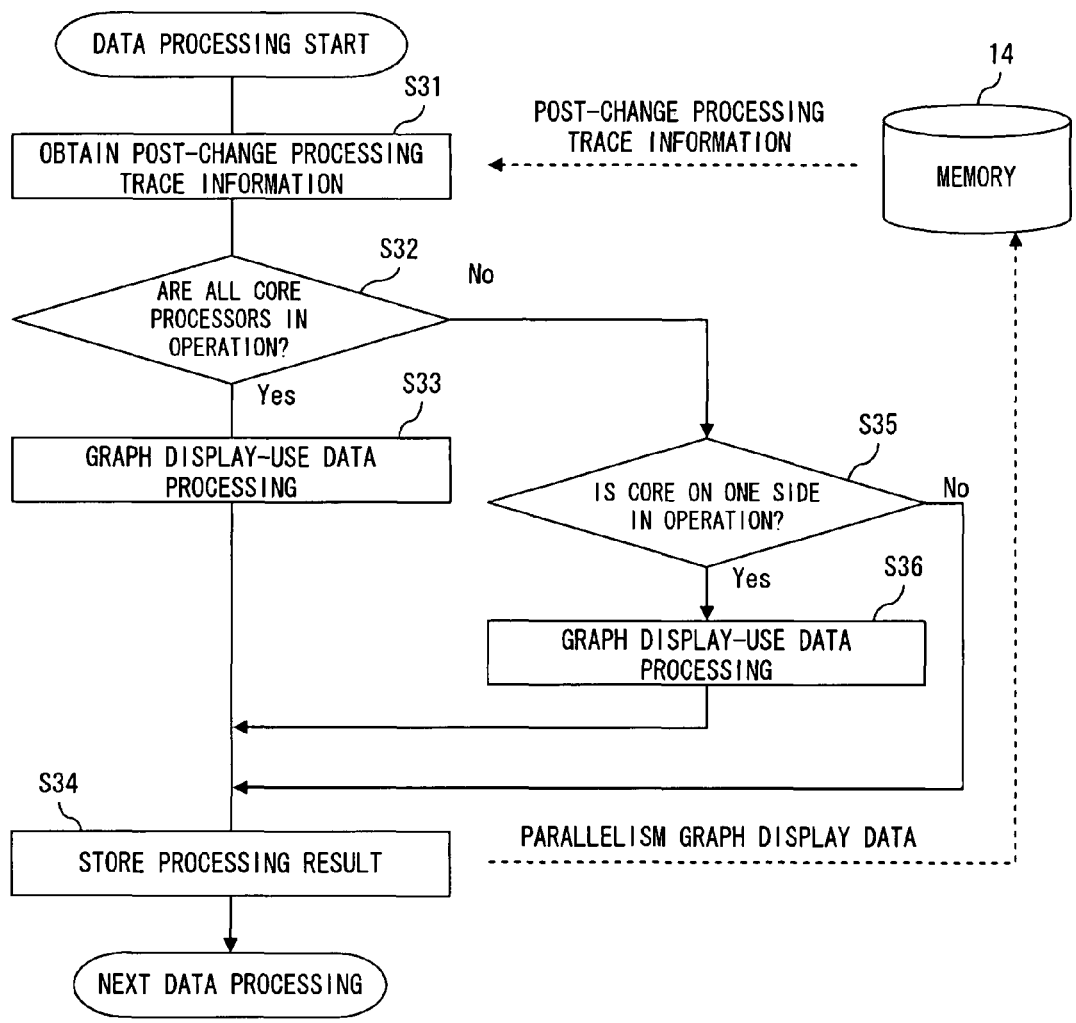
F I G. 1 5

TASK TRANSITION CHART DISPLAY
METHOD AND DISPLAY APPARATUS

CROSS REFERENCE TO RELATED
APPLICATIONS

This application claims the benefit of Japanese Patent Application No. 2006-147279 filed May 26, 2006 and Japanese Patent Application No. 2006-184661 filed Jul. 4, 2006, in the Japanese Patent Office, the disclosure of which is hereby incorporated by reference.

BACKGROUND OF THE INVENTION

1. Field of the Invention

The present invention relates to a display apparatus and display method of a task transition chart as a time chart indicating a transition among a plurality of tasks in response to an application program executed on a multitask operating system (OS).

2. Description of the Related Art

In an evaluation of application software operating on a multitask operating system (OS) and of an embedded system using a multitask OS, used is a task transition chart indicating a task transition repeated among a plurality of tasks. A use of a task transition chart makes it possible to detect a spot of an unexpected inappropriate task transition and to estimate the error occurring points in the system. In a task transition chart, however, even if similar inappropriate task transitions occur, their causes may not be the same, thus necessitating a comparison of other pieces of data and/or an estimation of the causes by using know-how of an operator. This consequently created a problem of needing to rely on know-how and a manual work in order to analyze a cause for a degraded performance, such as a caching mistake (noted as "mis-caching" hereinafter) and a memory access conflict, in relation with a task transition.

A reference patent document 1 as a conventional technique related to a trace information search for examining such a task transition has disclosed a trace information search apparatus capable of effectively debugging on the basis of trace information even if there is a necessity of verifying plural kinds of dictionaries and information related to those dictionaries. Such a conventional technique, however, has not been able to solve the problem of inability to display a task transition chart displayed on the basis of trace information automatically in relation with performance information. That is, it has not been able to solve the problem in which there is a limit in a conventional manual method for discovering a problem by correlating a task transition chart with performance information due to an embedded system becoming a large scale or a multi-processor system.

Patent document 1: Laid-Open Japanese Patent Application Publication No. 2003-208333 "Trace information search apparatus and method therefor"

Next, let it be described a conventional technique for displaying a degree of parallelism (sometimes abbreviated as "parallelism" hereinafter) as one evaluation criteria of an operation of a multiprocessor system. The parallelism is a reference of indicating how many of a plurality of processors constituting a multiprocessor system has operated at a certain clock time for example. It is extremely important to evaluate the parallelism and optimize the program in order to improve a processing performance of the multiprocessor system.

A reference patent document 2 as a conventional technique related to a display of such parallelism has disclosed a technique for facilitating a tuning of a parallelism by expressing a parallelism for each module constituting an application program. Being applicable when parallelly processing a single module by a plurality of processors, the technique, however, is faced with a problem of being unable to apply to a system of an asynchronous multiprocessor (ASMP) system by parallel processing of a plurality of modules with a plurality of processors. The technique is also faced with a problem of being difficult to identify a minute identification of a spot of low parallelism, and therefore a judgment of whether or not it is actually possible to optimize must rely on a total judgment by measuring with another tool such as a task transition chart or the like, or on the know-how of the user.

Likewise, a reference patent document 3 as a conventional technique displaying a parallelism has disclosed a method for displaying a state of a parallel program operation which is applicable to an ASMP type system; the method, however, is also faced with a problem of being difficult to identify a minute identification of a spot of low parallelism, and therefore a judgment of whether or not it is actually possible to optimize is also difficult likewise a reference patent document 2.

Patent document 2: Laid-Open Japanese Patent Application Publication No. H04-215192 "Method for expressing a parallelism of a parallel computer"

Patent document 3: Laid-Open Japanese Patent Application Publication No. H09-73405 "Method for displaying a parallel program operation state"

SUMMARY OF THE INVENTION

A first purpose of the present invention is to display performance information superimposed on a task transition chart, thereby enabling an analysis of correlation between the task transition and performance information and an easy detection of a spot of a degraded performance and a spot for tuning.

A second purpose of the present invention is to display a degree of parallelism of operations of individual core processors constituting a multiprocessor system temporally synchronized with a task transition chart, thereby clearly identifying a relationship between the parallelism and task transition, and enabling an easy detection of a spot of a program which is possible to be optimized.

A task transition chart display method according to the present invention is a method for displaying a task transition chart indicating a transition state of a task executed within a multi-core processor system, comprising: obtaining internal trace information of a plurality of core processors within the multi-core processor system and performance information corresponding to the trace information both from memory; and displaying task transition states of individual core processors simultaneously on the basis of the trace information and also displaying performance information superimposed on the task transition chart.

A task transition chart display apparatus according to the present invention is an apparatus for displaying a task transition chart for an application program operating on a multitask operating system, comprising: a data obtainment unit for obtaining trace information indicating the task transition and performance information corresponding to the trace information both from memory; and a monitor for displaying the performance information superimposed on the task transition chart based on the trace information.

Also, a task transition chart display method according to the present invention is one for displaying a task transition chart indicating a transition state of a task executed within a multi-core processor system, comprising: obtaining trace information indicating operation states of a plurality of core processors constituting the multi-core processor system from memory; calculating a degree of parallelism corresponding to operation states of the plurality of core processors based on the trace information; and displaying the calculated degree of parallelism by temporally synchronizing with a task transition chart indicating a state of the task transition.

Also, a task transition chart display apparatus according to the present invention is an apparatus for displaying a task transition chart indicating a transition state of a task executed within a multi-core processor system, comprising: a data obtainment unit for obtaining trace information indicating operation states of a plurality of core processors constituting the multi-core processor system from memory; a parallelism calculation unit for calculating a degree of parallelism corresponding to operation states of the plurality of core processors based on the trace information; and a monitor for displaying the calculated degree of parallelism by temporally synchronizing with a task transition chart indicating a state of the task transition.

As described above, the present invention is contrived to display a condition of a task transition and performance information in superimposition, thereby making it possible to analyze the task transition and performance information in correlation with each other in a multiprocessor-use embedded system for example.

The present invention is also contrived to display a degree of parallelism of processing by individual core processors constituting a multiprocessor system in a form of temporally synchronizing with a condition of a task transition, thereby enabling an easy detection of a spot in which a degree of parallelism is low and of a spot of a program which is possible to be optimized.

BRIEF DESCRIPTION OF THE DRAWINGS

FIG. 2 is a configuration diagram of a multiprocessor system according to the first embodiment;

FIG. 5 is a diagram describing an obtainment procedure of trace information and performance information according to the first embodiment;

FIG. 7 is a detailed flow chart of a task transition chart display line attribute determination processing according to the first embodiment;

FIG. 8 is an example of data used for the processing shown in FIG. 7;

FIG. 9 is an example of trace memory storage data according to the first embodiment;

FIG. 10 is an example of performance information storage according to the first embodiment;

FIG. 11 is an example of trace memory storage data including performance information according to the first embodiment;

FIG. 15 is a detailed flow chart of the degree of parallelism data processing shown in FIG. 14.

DESCRIPTION OF THE PREFERRED EMBODIMENTS

Figure 1A:
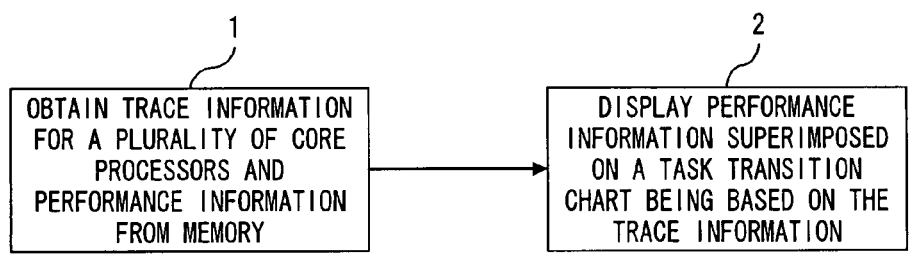
FIG. 1A is a fundamental functional block diagram of a task transition chart display method corresponding to a first embodiment of the present invention.
Figure 1B:
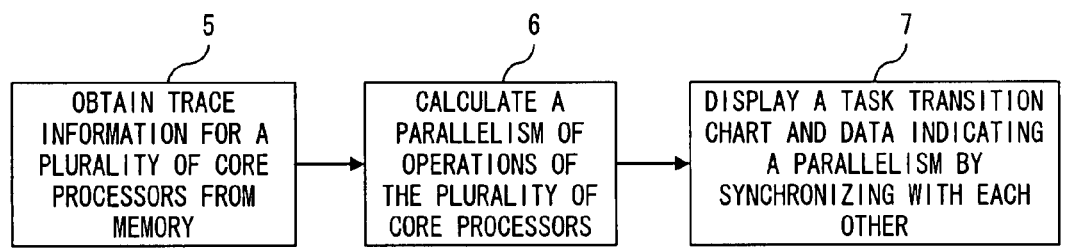
FIG. 1B is a fundamental functional block diagram of a task transition chart display method corresponding to a second embodiment of the present invention.

FIGS. 1A and 1B each is a fundamental functional block diagram of a task transition chart display method according to the present invention;

FIG. 1A is a fundamental diagram corresponding to a later described first embodiment, aiming at solving the above described first problem. FIG. 1B corresponds to a later described second embodiment, aiming at solving the second problem.

Referring to FIG. 1A, trace information for a plurality of core processors within a multi-core processor system and performance information corresponding to the trace information are obtained from memory in step 1, and the performance information is displayed by superimposing on a task transition chart indicating a task transition state between the plurality of core processors based on the trace information in step 2.

While in FIG. 1B, trace information for a plurality of core processors constituting a multiprocessor system is obtained from the memory first in step 5, a parallelism of operations of the plurality of core processors is calculated on the basis of the trace information in step 6, and a task transition chart and data indicating a parallelism of operations of the plurality of core processors are displayed in a form of being temporally synchronized with each other in step 7.

As such, the present invention is contrived to enable a display of performance information superimposed on a task transition chart. It is also contrived to enable a temporally synchronized display of a task transition chart and data indicating a parallelism.

The following is a further detailed description of a preferred embodiment of the present invention by dividing into two embodiments. The first embodiment corresponds to the fundamental functional block diagram shown in FIG. 1A, in which a task transition chart is displayed in a form of superimposing performance information on a task transition chart. The following is a description of the first embodiment by referring to FIGS. 2 through 11.

FIG. 2 is a block diagram exemplifying a configuration of a multiprocessor system according to the first embodiment of the present invention. Referring to FIG. 2, a task transition display apparatus 15, in addition to a plurality of processors, i.e., a processor 10 (core 0) and a processor 11 (core 1) herein, an input unit 12, a monitor 13 and a memory 14, is connected to a common bus 16. Note that the monitor 13 is comprised separately from the task transition display apparatus 15, and therefore it is apparent that the monitor 13 can also be used for displaying a task transition chart.

Figure 3:
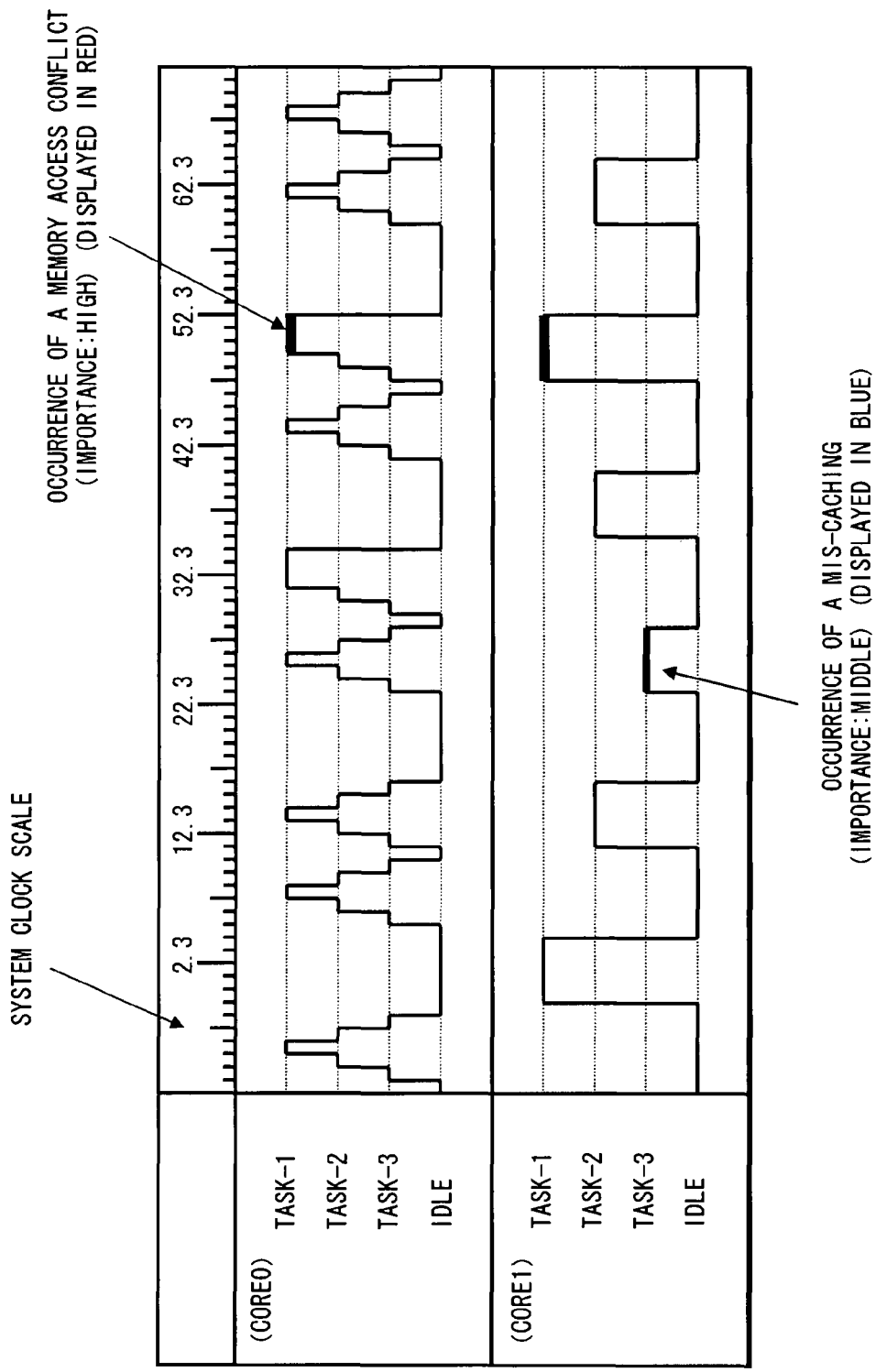
FIG. 3 is a display example of a task transition chart attached with performance information.

FIG. 3 is a concrete example of a task transition chart displayed in the first embodiment. Referring to FIG. 3, shown are task transition charts in the case of three tasks being carried out respectively in the cores 0 and 1 corresponding to two processors 10 and 11 shown in FIG. 2.

And shown in the task transition charts are performance information, i.e., a degree of mis-caching occurrence and that of the occurrence of a memory access conflict, by correlating with the tasks, in which such performance degradations have occurred, in the time chart.

That is, shown here are the occurrence of a mis-caching during the execution of the task 3 on the core 1 side in the vicinity of 22.3 milliseconds on the system clock scale, and the occurrence of a memory access conflict in the task 1 on the core 1 side and the task 1 on the core 0 side in the vicinity of the 47.3 milliseconds. As an example, showing the display color of a line for a mis-caching in blue, that of a line for a memory access conflict in red, and displaying a degree of importance as a degree of performance degradation by making a line width, i.e., a thickness of a line, double the thickness of the other part in the case of "middle" importance, and triple the thickness in the case of "high" importance result in displaying the cause and the degree of a performance degradation superimposed on the task transition chart, thereby making it possible to try to improve the performance by eliminating the performance degradation cause, that is, to attempt a tuning.

Note that FIG. 3 exemplifies a display of the number of mis-caching and a memory access conflict, as performance information, superimposed on the task transition chart; it can be configured to enable a display of other pieces of performance information, such as the number of interrupts, the number of execution cycles, the number of memory reads, the number of memory writes, the number of mis-reads of memory, a direct memory access (DMA) execution time, the number of register interferences, together with degrees of the performance degradations, superimposed on the task transition chart.

Figure 4:
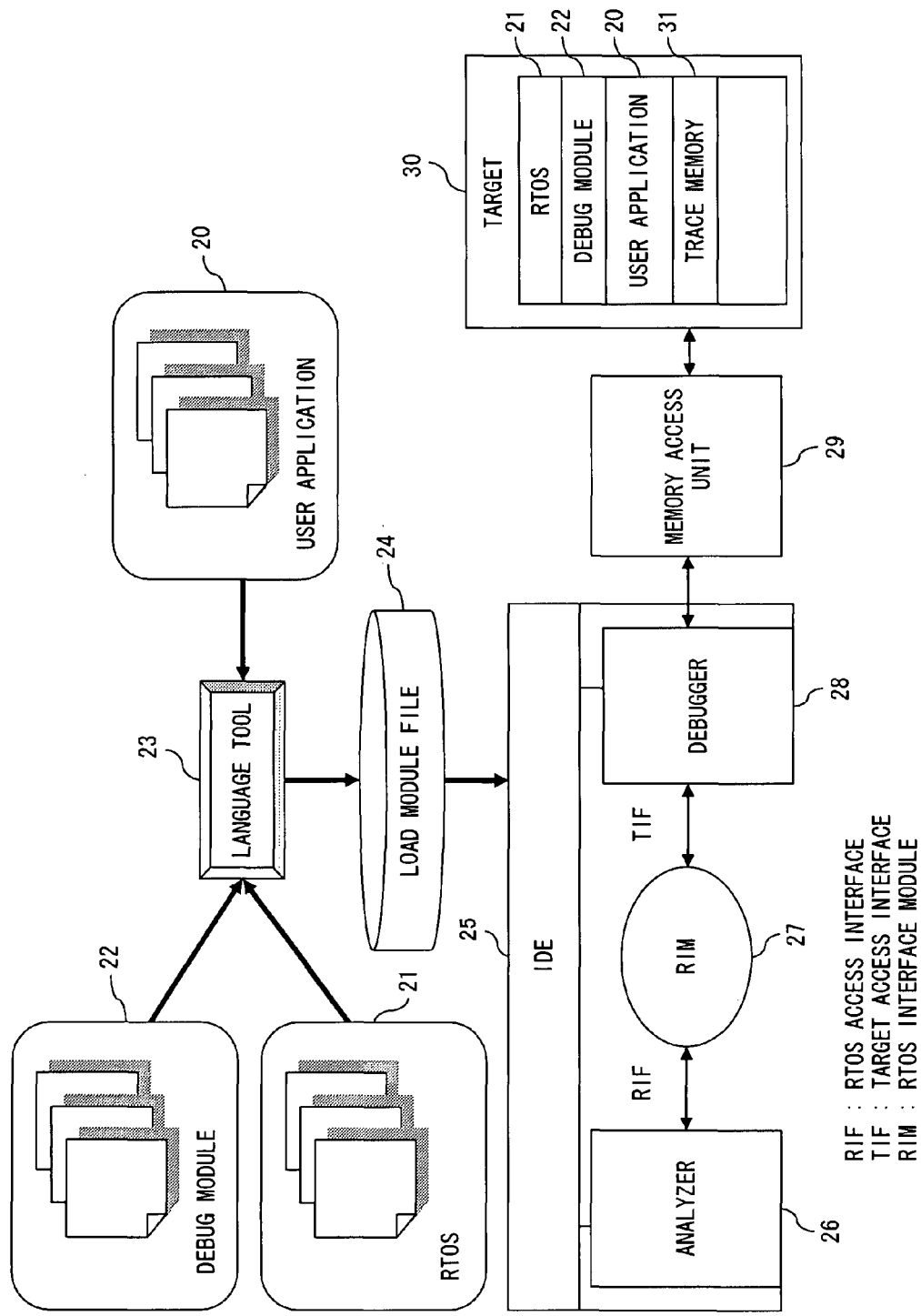
FIG. 4 is a configuration block diagram of a task transition chart display apparatus according to the first embodiment.

FIG. 4 exemplifies a configuration of a task transition chart display apparatus according to the first embodiment. Referring to FIG. 4, a user application 20, a real time operating system (RTOS) 21 and a debug module 22 are given to a language tool 23, and a load module file 24 as a data processing program is produced. Here, the reason for using the real time operating system (RTOS) 21 is that an embedded system requires the operating system to start operating at the time of pressing a button for example, thus requiring the use of a real time operating system.

The load module file 24 is given to an integrated development environment (IDE) for proceeding with a development process. The environment is internally equipped with an analyzer 26 and a debugger 28; an RTOS interface module (RIM) 27 is equipped between the analyzer 26 and debugger 28; the analyzer 26 and RIM 27 are interconnected by an RTOS access interface (RIF); and the RIM 27 and debugger 28 are interconnected by a target access interface (TIF).

The debugger 28 is configured to be capable of accessing to the trace memory 31 in the inside of a target 30 by a function of a memory access unit 29. The target 30 is a processor, for example, in which the RTOS 21, debug module 22 and user application 20 are internally furnished. Note that the data obtainment unit of the claim 5 of the present invention can conceivably be the memory access unit 29 of FIG. 4 as the basis with the RIM 27 and debugger 28 being included.

FIG. 5 is a diagram describing an obtainment procedure of trace information and performance information at the task transition chart display apparatus shown in FIG. 4. The first description here is a procedure for obtaining trace information stored in the trace memory 31. When a request for obtaining data from the trace memory occurs in the analyzer 26, an obtainment of a trace log is requested to the RIM 27 in order to read contents of the trace memory 31 existing in the user memory zone in the arrow (1), an instruction is given to the debugger 28 from the RIM 27 for reading the contents of the trace memory 31 in the arrow (2) and a data read access to the trace memory 31 by way of the memory access unit 29 is carried out by the debugger 28 in the arrow (3).

The contents of the readout trace memory 31, that is, the trace information, is reported to the debugger 28 by way of the memory access unit 29 in the arrow (4), and reported from the debugger 28 to the RIM 27 in the arrow (5). Then the data required by the analyzer 26 is reported from the RIM 27 to the analyzer 26 in the arrow (6), thus completing a data obtainment of the trace memory.

The configuration is such that the performance information data such as the above described number of mis-caching and memory access conflict are stored in a memory zone (not shown in a drawing herein) in the inside of the target 30, that is, the processor, and they are reported to the analyzer 26, likewise the trace information, in response to a counter value of a hardware counter for example.

Figure 6:
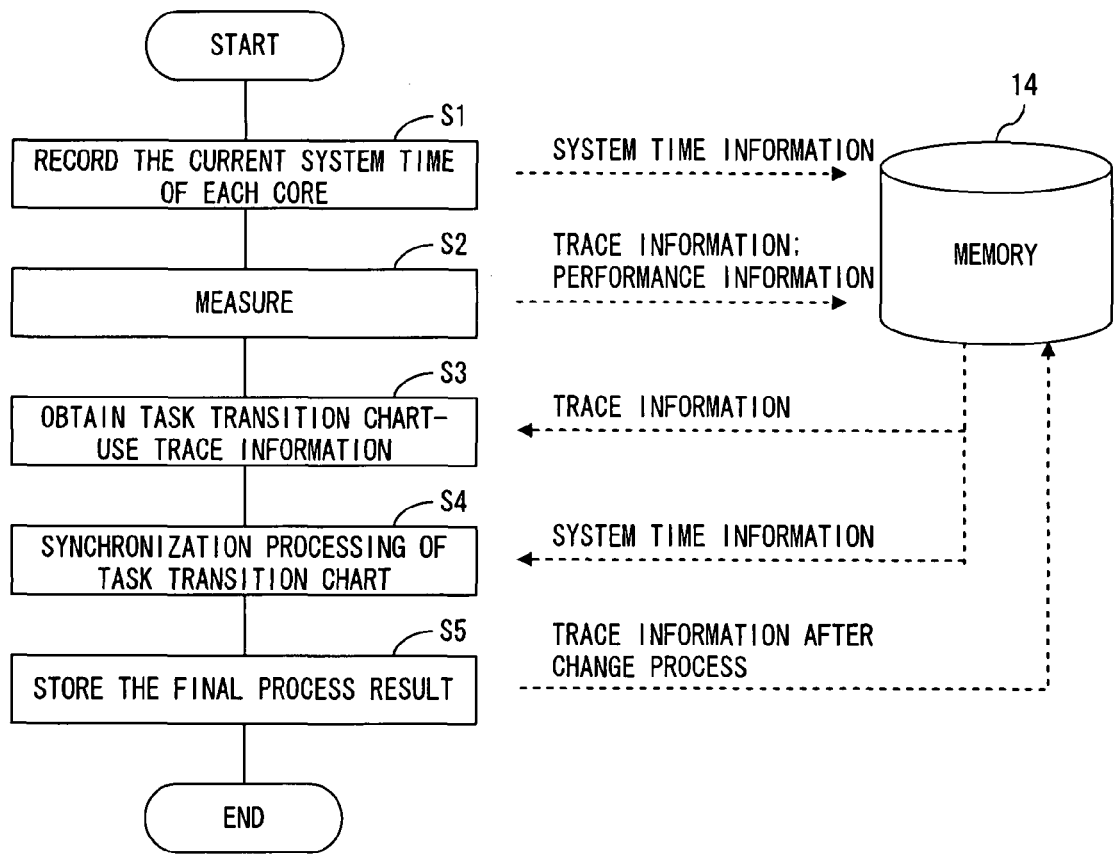
FIG. 6 is a flow chart of a task transition chart display-use data processing according to the first embodiment.

FIG. 6 is a flow chart of a task transition chart display-use data processing according to the first embodiment. As the process is started in FIG. 6, first, information of the current system time of each core processor is stored in the memory 14 of FIG. 2, for example, as a record of the current system time of each core processor constituting the multiprocessor system, in the step S1. Here, the configuration is such that each core processor constituting the multiprocessor system is internally equipped with a timer indicating a system time, and that there is a possibility of system clock time differences occurring among timers equipped in the individual core processors. Assuming that the system clock time is 1 millisecond for the core 0 and 10 milliseconds for the core 1 at the time of starting a process as shown in FIG. 6, these clock times are stored as the system time information in the memory 14.

Next, various measurements are carried out in the inside of the multiprocessor system, and the trace information and performance information are stored in the memory 14 in the step S2. Subsequently, a temporal synchronization processing is carried out for the task transition chart display-use trace information in the steps S3 through S5. First, the task transition chart display-use trace information is obtained from among the data stored in the memory 14 in the step S3, followed by a synchronization processing of the task transition chart being carried out in the step S4.

In the synchronization processing of the task transition chart, the system time information for each core processor stored in the memory 14 in the step S1 is obtained and a synchronization processing is carried out. That is, if the system clock time at the time of starting the processing of FIG. 6 is 1 millisecond for the core 0 and 10 milliseconds for the core 1 as described above, resulting in the difference of 9 milliseconds of system times between these cores, and they are therefore temporally synchronized for a task transition chart by shifting the system time on the core 1 side by 9 milliseconds for example.

Lastly, the trace information after synchronizing the system time, that is, after the processing of change is carried out, is stored as the final processing result in the memory 14 in the step S5, and the processing ends.

FIG. 7 is a detail flow chart of a task transition chart display line attribute determination processing corresponding to performance information obtained by the analyzer 26, that is, measurement data. As a measurement is started in FIG. 7, and the measurement data is obtained in the step S11, judged is whether or not the measurement data, that is, the performance information, is performance information for which the colors of the line is to be changed, in the step S12. As described for FIG. 3 for example, if it is a measurement result indicating an occurrence of a mis-caching, it may be displayed in blue, and it is necessary to use a different display color other than a common default display color, e.g., black, for a task transition chart display line in this case, e.g., and therefore a display color to be used is obtained from a file storing a display color of a measurement result corresponding to the category of measurement result, in the step S13, followed by displaying a line for a task of an corresponding position within a task transition chart in a determined color in the step S15, that is, a display color to be used. If there is no need to change colors of the line in the step S12, the display color is determined to be a default color, e.g., black, in the step S14 and the line is displayed in the color in the step S15.

Subsequently judged in the step S16 is whether or not the category of the performance information is a measurement result of a category for which a line width is to be changed. If it is to be displayed in double or triple the line width as described in FIG. 3, judged is whether or not the measurement result is larger than the threshold value for using the triple, that is, a thick line, in the step S17 and, if it is larger, the thickness of the line to be displayed is determined to be triple in the step S18, followed by displaying the line of the determined thickness in the step S19.

If the measurement result is not larger than the threshold value of the thick line in the step S17, then judged in the step S20 is whether or not the measurement result is larger than a threshold value for using a double the line width and, if it is larger, the thickness of the line to be displayed is determined to be double, followed by displaying the line by the determined thickness in the step S19. If the measurement result is not larger than the threshold value for displaying in the middle thickness line in the step S20, or the measurement result as performance information is not a category of changing a thickness of line in the step S16, the thickness of the line to be displayed is determined to be a default value, that is, the same thickness as that of other parts and the line is displayed in the step S19, followed by shifting to a measurement for the next measurement section for example.

Let it be assumed that the section of the left end to right end of the system clock scale in FIG. 3 for example is a single measurement section, that a task transition chart is displayed in correspondence to a single measurement section, that all pieces of performance information to be measured are measured in the single section, and that a task transition chart superimposed with performance information corresponding to the measurement result is displayed.

Note that FIG. 7 describes the embodiment which is configured to change line colors and the thickness of the line as the attributes of the display line; it is, however, apparently possible to change other attributes, e.g., line categories (e.g., a solid line, a chain line, and a dotted line).

FIG. 8 exemplifies contents of data storage for determining an attribute of the line in FIG. 7 such as line thicknesses and line colors stored in a file and a judgment threshold value of a performance degradation condition. Referring to FIG. 8, the first line shows the fact of three categories of line thicknesses existing, with the second through fourth lines showing the respective line thicknesses in the numbers of pixels. The fifth line shows that there are six categories of line colors with the sixth through eleventh lines storing values of RGB for the six line colors in values of data 1 through data 3.

The twelfth line shows the number of parameters as performance information to be measured being "2", with the thirteenth and fourteenth lines storing threshold value of a degree of importance and data of the line thickness and line color in the case of exceeding the threshold value respectively corresponding to the number of mis-caching and the memory access conflict as two parameters.

As an example, the threshold value of the thick line used for the judgment of the step S17 of FIG. 7 is "50" of the data 9 for the parameter of the number of mis-caching, and the line thickness to be displayed is the amount of 30 pixels corresponding to the line 3, and the display color becomes one specified by the color 3, if the number of mis-caching exceeds 50 times.

Next, the threshold value of the middle thickness line used for the judgment of the step S20 is 20 times and, if it exceeds the threshold value and is less than 50 times, then the line thickness constitutes "double" (i.e., the amount of 20 pixels) and the line color is a color specified by the color 2. If the number of mis-caching is between five times and 19 times (inclusive), the line width is the amount of 10 pixels and the line color is a color specified by the color 1. Then, if the number of mis-caching is less than five times, the line thickness and line color are not changed in correspondence thereto, with the display of a task transition chart being carried out in a default thickness (e.g., the amount of five pixels) and a line color (of RGB (not shown in a drawing)). Note that the line widths and line colors corresponding to a single piece of performance information have both four categories herein.

FIG. 9 is an example of trace information stored in the trace memory 31 shown in FIG. 4. Referring to FIG. 9, the log type indicates the format of log data, by which type the contents of data to be stored in the trace memory is determined. The LOG_LEAVE of the type event means the start of a log, and the LOG_ENTER thereof means the end of a log. The Task ID may be the same for the LOG_LEAVE and LOG_ENTER as a type event; they are basically different, however.

The low clock time means the start clock time of the task, and the high layer clock time means the end clock time of the task. In FIG. 3 as an example, the low clock time expresses the clock time at which an idle state has shifted to the process of the task 3 and the high clock time expresses the clock time at which the task 3 has shifted back to the idle state, including the time in which the processes have shifted to the task 2 and task 1 during the processing, for the task 3 on the core 0 side.

As for data of the number of mis-caching and the number of register interferences as parameters, that is, performance information, the configuration is such that the high clock time, that is, the value of each parameter of the end clock time of the task is stored in correspondence with the task ID.

FIG. 10 is an example of performance information data stored in memory (not shown herein) in the inside of the target 30 shown in FIG. 4. The configuration is such that the performance information is stored by accumulating the number of mis-caching and the number of interrupts for example correlated with the number of cycles with a reference being the time of starting up the real time operating system (RTOS) for example, and for example, the fact that the number of mis-caching has increased from 100 times to 110 times, i.e., an increase of ten times, is judged from the storage contents of the memory during the time in which the number of cycles increased from "421351000" to "441351000".

Therefore, a correlation between the low clock time and high clock time of FIG. 9 and the number of cycles of FIG. 10 makes it possible to judge, at what clock time, during processing of what task, how many mis-caching have occurred, and display a task transition chart superimposed with the performance information as described for FIG. 3 by using the flow chart described for FIG. 7 and the attribute data of the display line of the task transition chart described for FIG. 8.

FIG. 11 is an example of data storage when storing both of the trace information and performance information in the trace memory. The performance information is added on the rightmost, in addition to the trace information described for FIG. 9. The performance information is a single piece of performance information such as the number of mis-caching; it is, however, of course possible to store plural kinds of performance information in the trace memory.

The next is a description on the second embodiment of the present invention by referring to FIGS. 12 through 15. The second embodiment, corresponding to the fundamental diagram of FIG. 1B as described above, is configured to display a parallelism of processes of a plurality of core processors constituting a multiprocessor system in the form of being temporally synchronized with the task transition chart.

Figure 12:
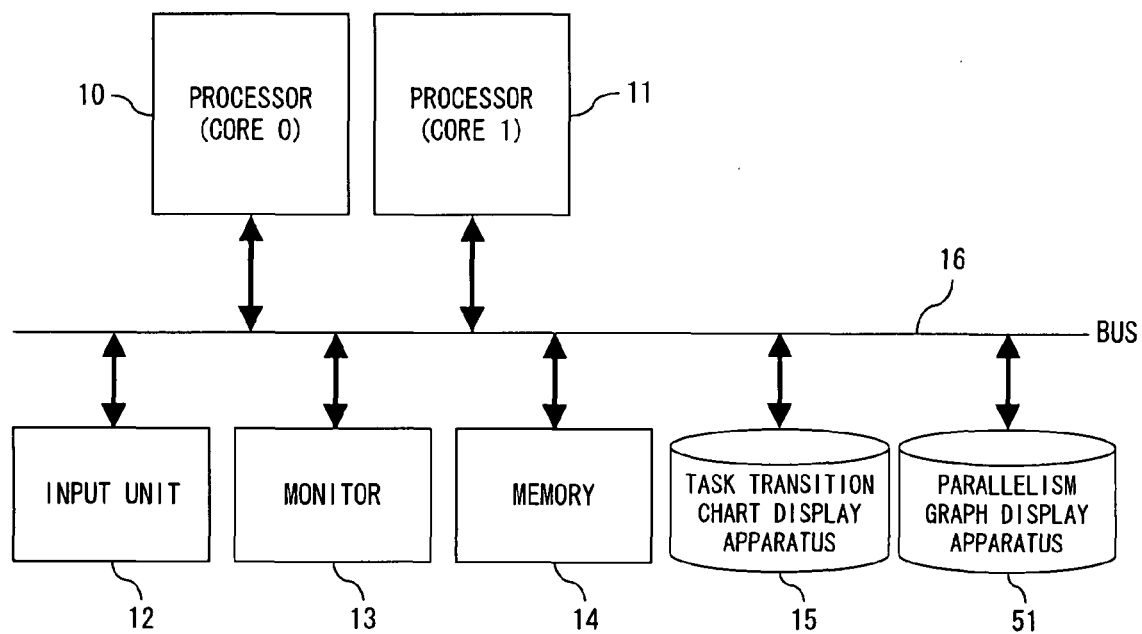
FIG. 12 is a configuration diagram of a multiprocessor system according to a second embodiment.

FIG. 12 shows a configuration of a multiprocessor system according to the second embodiment. Comparing with FIG. 2 corresponding to the first embodiment, the difference lies only in adding a parallelism graph display apparatus 51.

Figure 13:
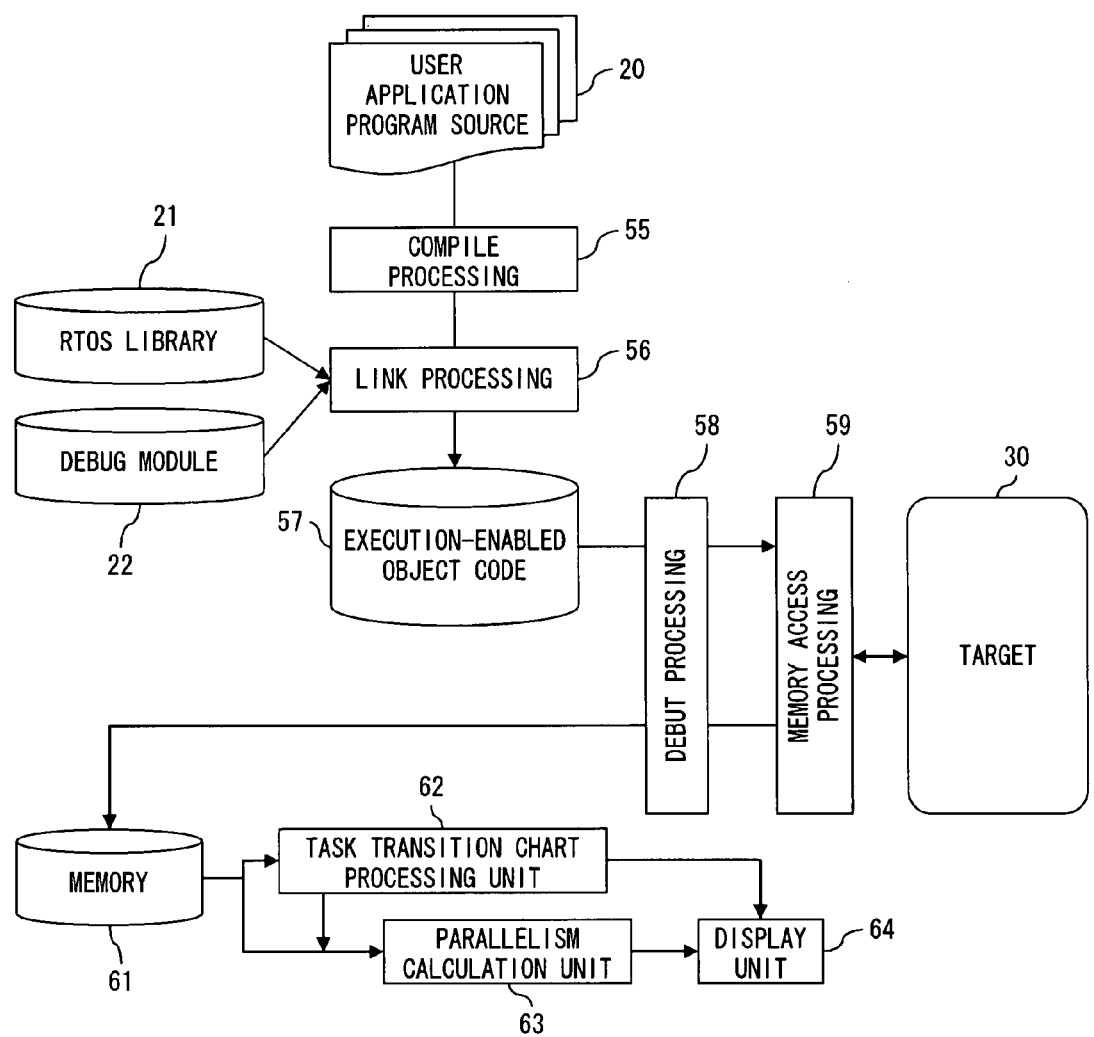
FIG. 13 is a configuration diagram of a parallelism graph display apparatus according to the second embodiment.

FIG. 13 shows a configuration of a parallelism graph display apparatus according to the second embodiment. The parallelism graph display apparatus corresponds to FIG. 4 of the first embodiment. The description here describes the configuration of the apparatus by focusing on a flow of processing.

Referring to FIG. 13, a compile processing 55 is carried out for the user application program source 20, followed by giving the result and the RTOS library 21 and debug module 22 which are described for FIG. 4 to a link processing 56, and generating an execution-enabled object code 57. The execution-enabled object code 57 corresponds to the load module file 24 shown in FIG. 4. The execution-enabled object code 57 is given to the target 30 by way of a debug processing 58 and a memory access processing 59.

Data required for displaying the task transition chart and parallelism is stored in a memory 61 from the target 30 by way of the memory access processing 59 and debug processing 58, given to a task transition chart processing unit 62 and a parallelism calculation unit 63, and displayed by a display unit 64 in the form of temporally synchronizing the parallelism with task transition chart. Note that the configuration here is such that the parallelism graph display apparatus 51 is enabled to display a task transition chart without using the task transition chart display apparatus 15 shown in FIG. 12.

Figure 14:
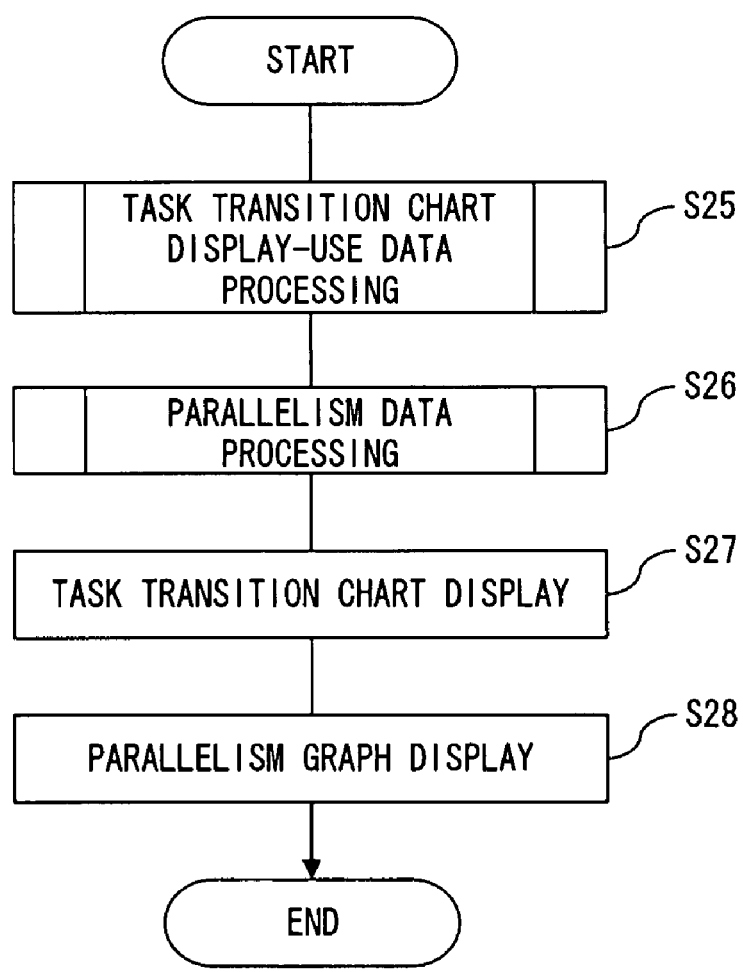
FIG. 14 is a basic process flow chart of a task transition chart display according to the second embodiment.

FIG. 14 is a basic process flow chart of a task transition chart display according to the second embodiment. As the process is started as shown in FIG. 14, carried out first is a task transition chart display-use data processing in the step S25. The processing is the same as one described for FIG. 6 associated with the first embodiment.

Subsequently carried out is a parallelism data processing in the step S26. In the processing, a parallelism of processes of individual core processors constituting a multiprocessor system is calculated at a certain time interval, e.g., 1 millisecond, and display-use data corresponding to the processing result is stored in the memory, of which the detail is described later for FIG. 15. Upon finishing these processes, a task transition chart is displayed in the step S27, and the degrees of parallelism are displayed by the change of colors at certain time intervals for example in the step S28 as described later, followed by finishing the process.

FIG. 15 is a detailed flow chart of the degree of parallelism data processing shown in the step S26 of FIG. 14. The processing is configured to execute repeatedly at certain time intervals in order to calculate degrees of parallelism of processes of a plurality of core processors constituting a multiprocessor system at the time intervals, e.g., one millisecond.

As the process is started as shown in FIG. 15, the trace information after the change processing is obtained from the memory 14 in the step S14. As described for FIG. 6, the trace information is data which has been subjected to a change processing corresponding to the difference among the system times of individual core processors and then stored in the memory 14 in the step S5 of FIG. 6.

Subsequently judged in the step S32 is whether or not all the core processors are in operation at the present clock time and, if they are in operation, then display-use data corresponding to the state of all the core processors operating, e.g., data of a display-use color, is obtained, as a data processing for a graph display in the step S33, and the processing result is stored as parallelism graph display data in the memory 14, followed by shifting to a data processing at the next clock time (i.e., 1 millisecond later).

If the judgment of the step S32 is that all the core processors are not necessarily in the operation state, judged next is whether or not a certain core is in operation in the step S35. Here, the description exemplifies the case of the core processors constituting a multiprocessor system being two for simplicity of description. And, if a core processor only on one side, that is, only one core processor is in operation, data of a display-use color corresponding to the parallelism, that is, "0.5", is calculated as a graph display-use data processing in the step S36, and the processing result is stored in the memory 14 in the step S34, followed by shifting to the next data processing.

If the judgment of the step S35 is that none of the two core processors is in operation, data of a default color indicating "0" as a parallelism is stored in the memory 14 in the step S34, followed by shifting to the next data processing.

Figure 16:
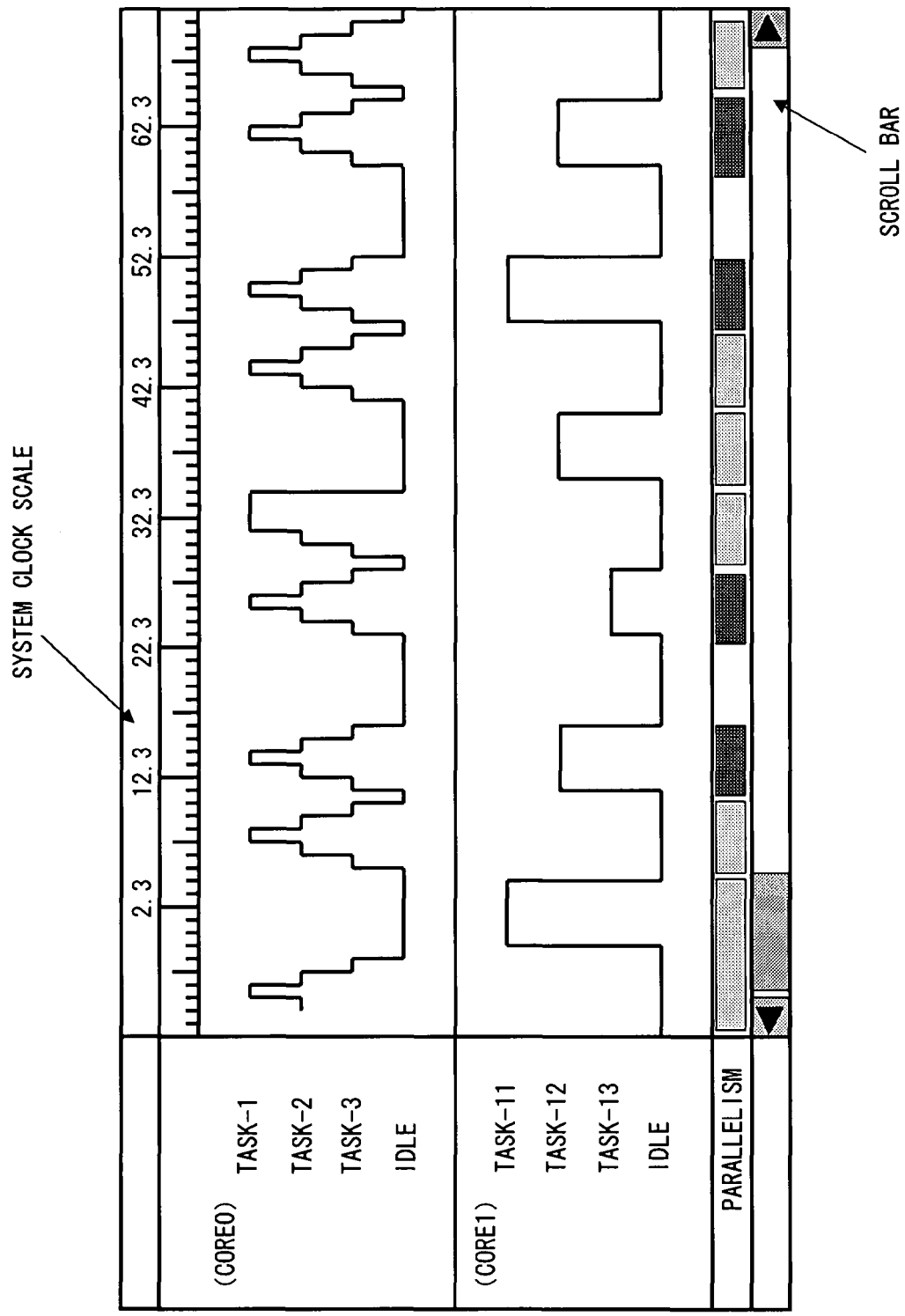
FIG. 16 is a display example of a task transition chart according to the second embodiment.

FIG. 16 is a display example of a task transition chart according to the second embodiment. FIG. 16 shows task transition charts for the core 0 and core 1 likewise FIG. 3 for the first embodiment; the tasks executed in the core 0 and core 1, however, are not the same, unlike the case of FIG. 3.

Here, the assumption is such that none of the core 0 and core 1, or either one thereof, is in the state of operation up to the vicinity of 12.3 milliseconds on the system clock scale. Therefore, the parallelism up to the clock time is shown in pale gray indicating "0.5" as the parallelism corresponding to the state of only either core being in operation, or in white indicating the fact of neither core being in operation.

Contrarily, both of the core 0 and core 1 are in the state of operation between 12.3 and 17.3 milliseconds on the system clock scale and the corresponding parallelism is in dark gray (black) indicating "1" as the parallelism. As such, the second embodiment is configured to calculate a parallelism of a multiprocessor system by the presence or absence of operation of the core processor and display the parallelism by a color differentiation for example.

The next is a description on a method for operating the core 1 side for example in a power save operation as much as possible, as an example of optimization processing by using a task transition chart display result shown in FIG. 16. That is, if the core 0 is in an idle state when the core 1 is in operation, it is possible to have the core 0 side carry out the processing of the core 1 side, and in specific, making the core 0 side carry out the processing of the task 11 of the core 1 side at around 2.3 milliseconds on the system clock scale and the processing of the task 12 of the core 1 side at around 38.3 milliseconds enables a reduction of power consumption on the core 1 side.

It is also possible to optimize the processing related to a bottleneck. Referring to FIG. 16, even if the processing result of the task 11 on the core 1 side is necessary for a later processing of the task 3 on the core 0 side, or likewise the processing result of the task 11 is necessary for a processing of the task 12 on the core 1 side, if the processing results of the tasks 3 through 1 on the core 0 side are not required for a processing of the task 12 on the core 1 side, the processing of the task 12 as the second task processing on the core 1 side can be temporally shifted forward so as to have it carried out immediately after the processing of the task 11, and the core 1 can be made to carry out another processing during the clock time of carrying out the task 12.

As described above, the second embodiment is configured to display a parallelism of processes among core processors constituting a multiprocessor system in the form of temporally being synchronized with the task transition chart, thereby making it possible to move a processing to be carried out between core processors, or have the same core processor carry out the processing by changing clock times, thus resulting in executing an effective optimization of a program.

While the preferred embodiments of the present invention have so far been described in detail, the scope the present invention extends to the items noted in the claims herein and to the equivalent, in lieu of being limited to the descriptions put forth in the present specification.

What is claimed is:

1. A task transition chart display method which is one for displaying a task transition chart of a multi-core processor, comprising:

obtaining internal trace information of a plurality of core processors within the multi-core processor and performance information corresponding to the trace information both from memory;

displaying task transition states of individual core processors simultaneously on the basis of the trace information and also displaying performance information superimposed on the task transition chart by correlating each of a start clock time and an end clock time of a task indicated by the trace information to a number of clock cycles indicated by the performance information; and temporally synchronizing a plurality of task transition charts of the core processors, each task transition chart indicating a state of a task transition in each core processor, by shifting a first system time of a first core processor among the core processors by a difference between the first system time and a second system time of a second core processor among the core processors when there is a difference between the first and second system times.

2. The task transition chart display method according to claim 1, displaying:

the number of mis-caching, a memory access conflict, the number of interrupts, the number of execution cycles, the number of memory reads, the number of memory writes, the number of mis-reads of memory, a direct memory access (DMA) execution time and the number of register interferences, all as said performance information.

3. The task transition chart display method according to claim 2, displaying:

spots where a mis-caching, a memory access conflict, a mis-reading of memory and register interference have occurred by emphasizing the spots, as said performance information.

4. The task transition chart display method according to claim 1, displaying:

spots where a mis-caching, a memory access conflict, a mis-reading of memory and register interference have occurred by emphasizing the spots, as said performance information.

5. A task transition chart display apparatus which is an apparatus for displaying a task transition chart for an application program operating on a multitask operating system, comprising:

a data obtainment unit configured to obtain trace information indicating the task transition and performance information corresponding to the trace information both from memory;

a monitor configured to display the performance information superimposed on the task transition chart being based on the trace information by correlating each of a start clock time and an end clock time of a task indicated by the trace information to a number of clock cycles indicated by the performance information; and temporally synchronizing a plurality of task transition charts of the core processors, each task transition chart indicating a state of a task transition in each core processor, by shifting a first system time of a first core processor among the core processors by a difference between the first system time and a second system time of a second core processor among the core processors when there is a difference between the first and second system times.

6. A task transition chart display method which is one for displaying a task transition chart indicating a transition state of a task executed within a multi-core processor system, comprising:

obtaining trace information indicating operation states of a plurality of core processors constituting the multi-core processor system from memory;

calculating a degree of parallelism corresponding to operation states of the plurality of core processors based on the trace information;

temporally synchronizing a plurality of task transition charts of the core processors, each task transition chart indicating a state of a task transition in each core processor, by shifting a first system time of a first core processor among the core processors by a difference between the first system time and a second system time of a second core processor among the core processors when there is a difference between the first and second system times; and displaying the task transition charts and the degree of parallelism calculated by temporally synchronizing the degree of parallelism with the task transition charts.

7. The task transition chart display method according to claim 6, displaying a color or pattern corresponding to a value of said degree of parallelism as data indicating the degree of parallelism.

8. The task transition chart display method according to claim 7 calculating said degree of parallelism for each of predetermined time interval and corresponding to an operation state of said plurality of core processors.

9. The task transition chart display method according to claim 6 calculating said degree of parallelism for each of predetermined time interval and corresponding to an operation state of said plurality of core processors.

10. A task transition chart display apparatus which is an apparatus for displaying a task transition chart indicating a transition state of a task executed within a multi-core processor system, comprising:

a data obtainment unit configured to obtain trace information indicating operation states of a plurality of core processors constituting the multi-core processor system from memory;

a parallelism calculation unit configured to calculate a degree of parallelism corresponding to operation states of the plurality of core processors based on the trace information; and a monitor configured to temporally synchronize a plurality of task transition charts of the core processors, each task transition chart indicating a state of a task transition in each core processor, by shifting a first system time of a first core processor of the core processors by a difference between the first system time and a second system time of a second core processor of the core processors when there is a difference between the first and second system times, and to display the task transition charts and the calculated degree of parallelism by temporally synchronizing the degree of parallelism with the task transition charts.

* * * * *